United States Patent [19]

Bergamini

[11] Patent Number: 5,365,971

[45] Date of Patent: Nov. 22, 1994

[54] SEAL SYSTEM, PARTICULARLY SUITABLE FOR PROCESS VALVES

[75] Inventor: Giorgio Bergamini, Bari, Italy

[73] Assignee: Nuovopignone-Industrie Meccaniche E Fonderia S.P.A., Florence, Italy

[21] Appl. No.: 131,547

[22] Filed: Oct. 5, 1993

[30] Foreign Application Priority Data

Oct. 9, 1992 [IT] Italy .................. MI92A002328

[51] Int. Cl.⁵ .............................................. F16K 37/00
[52] U.S. Cl. ..................................... 137/556; 251/355
[58] Field of Search ............... 137/312, 553, 551, 557, 137/556; 251/355

[56] References Cited

U.S. PATENT DOCUMENTS

| | | | |
|---|---|---|---|
| 2,691,773 | 10/1954 | Lichtenberger | 137/312 |
| 3,319,647 | 5/1967 | Morain | 137/312 |
| 3,719,203 | 3/1973 | Wettre | 137/554 |
| 3,896,280 | 7/1975 | Blake | 137/554 |
| 4,052,997 | 10/1977 | DeLorenzo et al. | 137/312 |
| 4,972,867 | 11/1990 | Ruesch | 137/312 |

FOREIGN PATENT DOCUMENTS 2186036A 8/1987 United Kingdom .
2207201A 1/1989 United Kingdom .

Primary Examiner—A. Michael Chambers
Attorney, Agent, or Firm—Morgan & Finnegan

[57] ABSTRACT

A seal system particularly suitable for a process valve, in which the intermediate chamber formed between two sliding seal gaskets arranged in series is connected to a static separator of elastic plenum chamber or bag type filled with a biodegradable, non-contaminating, non-aggressive auxiliary lubricant fluid, the internal plenum chamber or bag, which is of very high elasticity, being connected to the process fluid and cooperating with a movable head which itself cooperates with a position sensor. A modified embodiment is also described.

4 Claims, 2 Drawing Sheets

SEAL SYSTEM, PARTICULARLY SUITABLE FOR PROCESS VALVES

FIELD OF THE INVENTION

This invention relates to a seal system which by ensuring in a simple and economical manner that the process fluid can never leak by seepage through the seal member, is particularly suitable for process valves in that it provides effective environmental protection, as required in particular in processes using malodorous and/or toxic fluids.

BACKGROUND OF THE INVENTION

Protecting the environment against pollution and contamination deriving from seepage of process fluids is known to be one of the most serious problems to solve, in that a perfect seal between parts undergoing axial or rotary movement is substantially very difficult to achieve, is generally very costly and is evidently more complicated the higher the pressure of the fluid to be contained.

In the field of pumps, compressors, turbines and rotary machines in general, this problem is currently solved by a seal system comprising an intermediate chamber formed between two separate series-arranged seal members and into which a neutral barrier fluid, generally nitrogen, is continuously injected at a pressure slightly higher than that of the process fluid, which is hence unable to leak whereas the neutral barrier fluid continuously discharges, to be collected and re-used after repressurization with a pump.

Although this solution ensures zero loss, it has a series of drawbacks such as the need to use a pump and a dynamic pressure regulator, which has to be more precise, and hence more costly, in keeping the pressure difference small the smaller the amount of auxiliary fluid allowed to leak into the process fluid, with evident constructional and plant complications and a considerable power consumption, resulting in an increased cost and overall size to an extent unacceptable for a simple process valve. A further drawback is that there is always a considerable flow of the neutral barrier fluid, with consequent considerable losses, hence making it impossible in practice to detect small anomalies in this flow and thus to warn of possible danger before irreparable damage occurs due to leakages of the process fluid itself.

SUMMARY OF THE INVENTION

The object of the present invention is to obviate said drawbacks by providing a seal system which ensures the absence of seepage losses of the process fluid without the use of pumps and dynamic pressure regulators and hence with a very low space requirement and cost, which acts statically and hence requiring no power, and finally which provides indication of the commencement of seal degradation, ie detects with considerable anticipation any depletion of the neutral barrier fluid due to leakage, ie before process fluid leakage occurs.

This is substantially attained by completely annulling any pressure difference between the process fluid and an atoxic biodegradable lubricant auxiliary fluid filling said intermediate chamber which however is provided between two actual seal gaskets arranged in series, the pressure thereof being maintained always equal to the process fluid pressure by a highly elastic static separator of plenum chamber or bag type into which said auxiliary fluid is conveyed, the process fluid being conveyed into said highly elastic plenum chamber or bag which cooperates with a movable head which is urged against said plenum chamber by gravity or by a spring, to act as a position sensor and indicate a certain degree of expansion of said plenum chamber indicative of anomalies in the seals and more precisely of leakages of the auxiliary fluid through the second gasket downstream of said intermediate chamber. In this respect with such a construction, the absence of pressure difference not only allows the use of low pressure seal devices ensuring very long life without leakage, but also ensures that the process fluid not only cannot leak out, this being achieved without power consumption and by simple static members, but can neither be contaminated by the auxiliary fluid.

Said second seal gasket downstream of said intermediate chamber operates in effect with a pressure drop equal to the entire process pressure, and hence as it is impossible to also ensure zero leakage for the auxiliary fluid, a limited leakage thereof by seepage is accepted, the extent of this leakage being however always monitored by the movement of said movable head which at a certain point, before total expansion of the elastic plenum chamber or bag occurs and hence considerably before any leakage of the actual process fluid can take place, operates a switch which advises of the anomaly underway, and which can be immediately obviated by restoring the leakage of auxiliary fluid within said static separator.

Hence the seal system particularly suitable for a process valve comprising a valve body, and a valving element for the process fluid, the stem of which is slidingly supported by two separate seal members arranged in series to define between them an intermediate chamber fed with an auxiliary fluid, is characterised according to the present invention in that said intermediate chamber is provided between two actual sliding seal gaskets arranged in series, and is connected to a static separator of elastic plenum chamber or bag type, filled with said auxiliary fluid in the form of a biodegradable, non-contaminating, nonaggressive lubricant fluid, the internal plenum chamber or bag of very high elasticity being connected to the process fluid in the region adjacent to that seal closer to the valving member, said elastic plenum chamber or bag cooperating with a movable head which itself cooperates with a position sensor.

According to a modification of the present invention, a very small pressure difference is created between said auxiliary fluid and the process fluid in order to reliably ensure that the process fluid can never reach said intermediate chamber, not even as a result of the sliding of the valve stem.

This is achieved in practice in that said static separator of elastic plenum chamber or bag type is in this case connected to the process fluid in said region adjacent to that seal closer to the valving member, whereas the internal plenum chamber or bag, chosen with only a certain elasticity, is connected to said intermediate chamber.

In this manner, the pressure in said intermediate chamber is always equal to the sum of the process fluid pressure plus the very small pressure required to overcome the elasticity of the plenum chamber which opposes its inflation, and of which the value evidently depends on the degree of elasticity of the plenum chamber, said pressure hence being always slightly higher than that of the process fluid, which can consequently never seep into the intermediate chamber.

The invention is described in detail hereinafter with reference to the accompanying drawings, which illustrate preferred embodiments thereof given by way of non-limiting example in that technical or constructional modifications can be made thereto but without leaving the scope of the present invention. For example instead of being applied to a process valve, the seal system of the invention can be applied to pumps, compressors, turbines and any rotary machine in general; in addition a bellows can be used instead of an elastic plenum chamber or bag.

BRIEF DESCRIPTION OF THE INVENTION

DETAILED DESCRIPTION OF THE INVENTION

Figure 1:
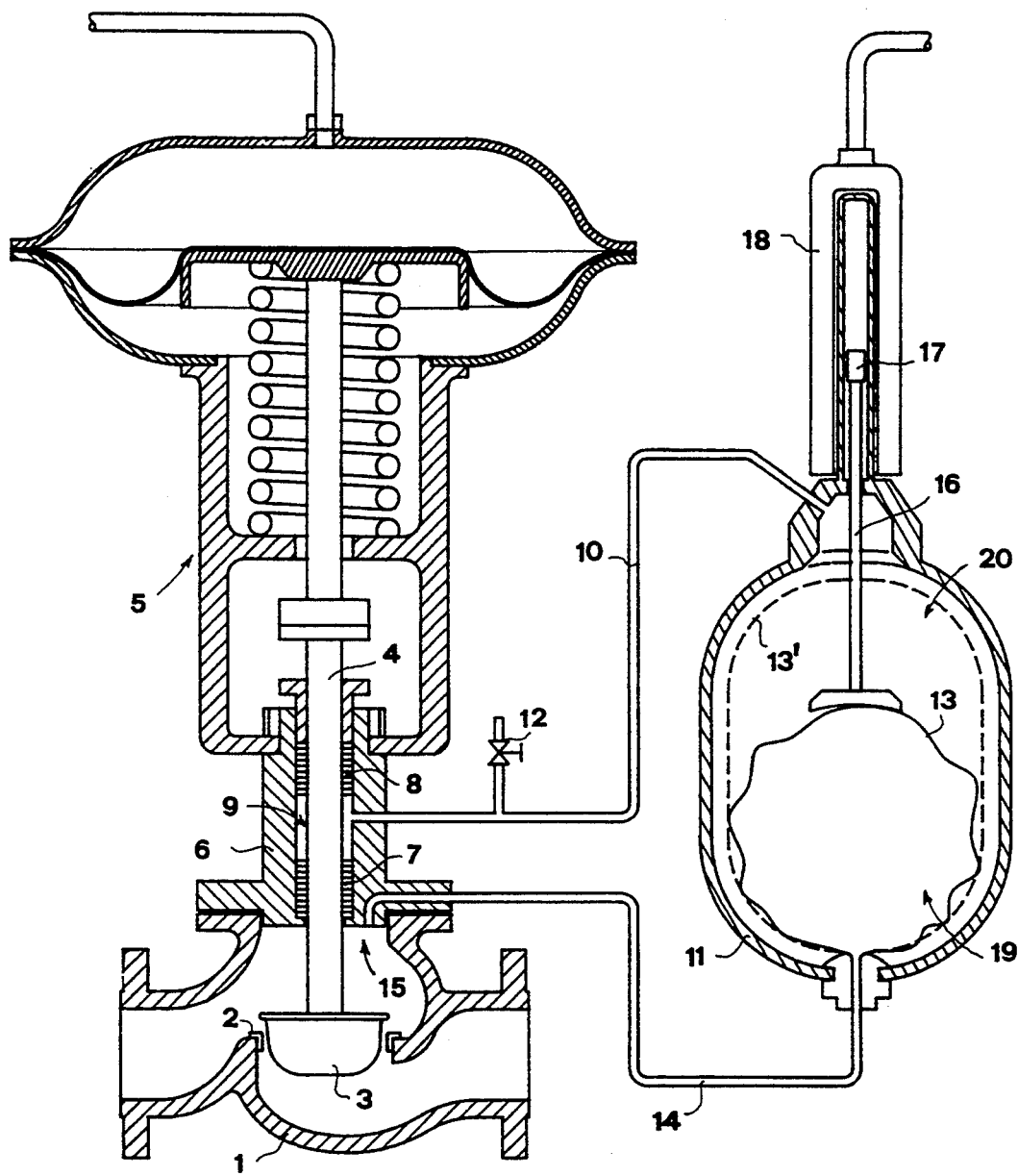
FIG. 1 is a side sectional view of a process valve using the seal system according to the invention.
Figure 2:
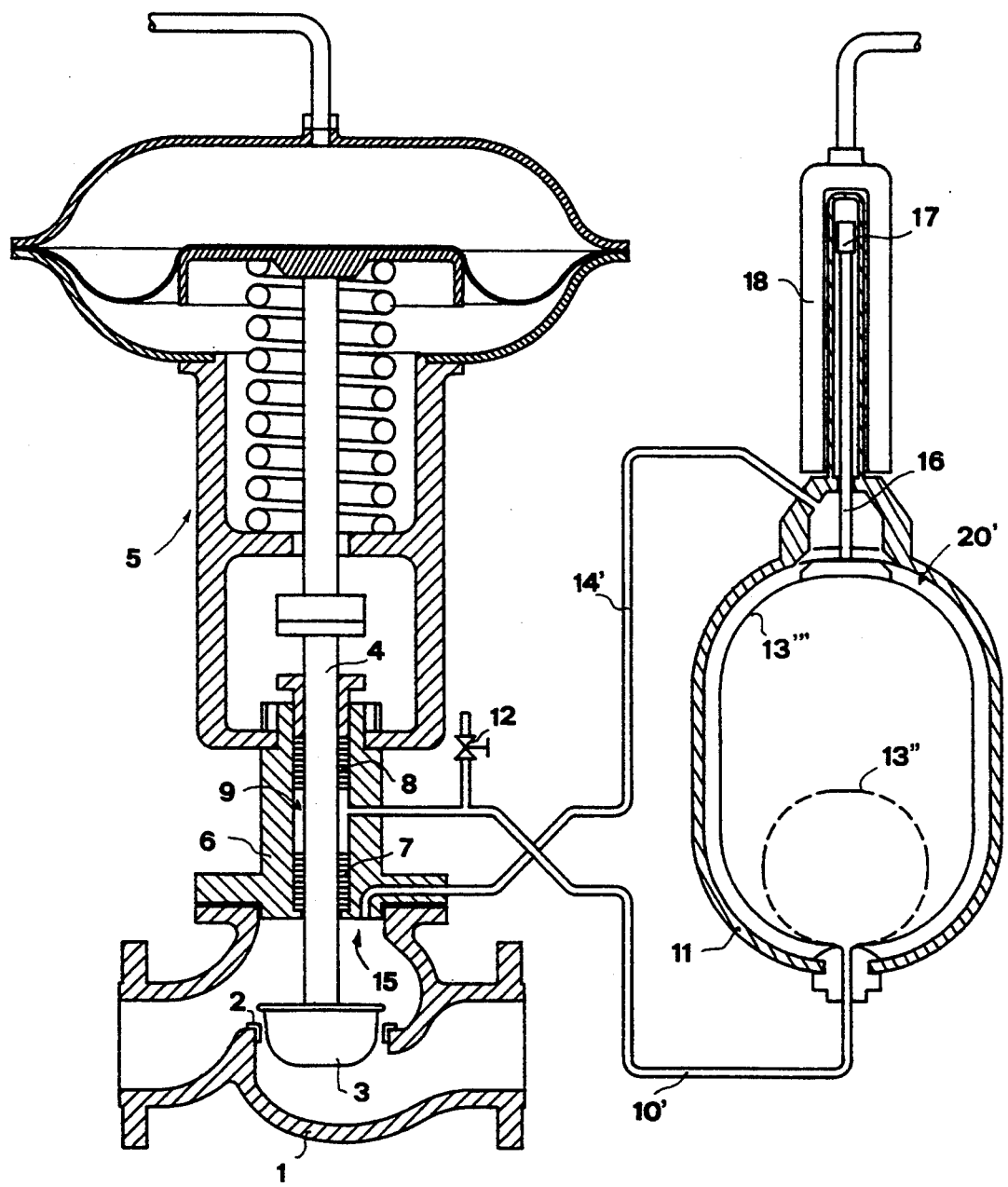
FIG. 2 is a view analogous to FIG. 1 but using a modified embodiment of the invention.

In FIGS. 1 and 2, the reference numeral 1 indicates the body of a process valve supporting the seat 2 for a valving member 3 which is operated by an actuator 5 via the stem 4. Said stem 4 is slidingly supported by the valve block 6 via the two separate sliding seal gaskets 7 and 8 arranged in series along the stem to define an intermediate chamber 9.

Said chamber 9 is connected via the pipe 10 to a static separator 11 of elastic plenum chamber or bag type and is filled, together with this latter, with a biodegradable non-contaminating nonaggressive auxiliary lubricant fluid fed through the on-off valve 12. The internal elastic plenum chamber or bag 13 of the static separator 11 is connected via the pipe 14 to the process fluid in the region 15 adjacent to that seal 7 closer to the valving member 3. The plenum chamber 13, of very high elasticity (in FIG. 1 the dashed line 13' indicates the size of said plenum chamber when pressure is absent), also cooperates with a movable head 16 which rests by gravity on said plenum chamber and carries a magnet 17 which controls a position sensor 18.

The method of operation is as follows.

The very high elasticity of the plenum chamber or bag 13 means that the pressure in the chamber 19 is always equal to that in the chamber 20 and hence to that in the intermediate chamber 9. When a leakage of auxiliary fluid through the gasket 8 causes a loss of pressure in the chamber 20, the corresponding expansion of the plenum chamber 13 causes the head 16 to rise, together with the magnet 17. The position sensor 18 senses said movement indicating poor sealing, and when said movement reaches a predetermined value blocks the operation of the valve. In the modified embodiment of FIG. 2, said intermediate chamber 9 is connected by the pipe 10' to said internal plenum chamber or bag which, by the effect of tile auxiliary fluid pressure, is inflated from the rest position shown by the dashed line 13" in FIG. 2 to the working position 13", the chamber 20' of the static separator 11 being connected by the pipe 14' to said region 15 in which the process fluid pressure is present.

In this manner in the intermediate chamber 9 there is pressure slightly higher than the pressure of the operating fluid by the amount required to overcome the in this case not exceptionally high elasticity of the plenum chamber opposing its inflation.

I claim:

1. A seal system for a process valve comprising a valve body, a valving element for controlling flow of process fluid through said valve body, said valving element having a stem that is slidingly supported by two spaced apart seal members arranged in series to define between said serially disposed seal members an intermediate chamber, a static separator having first and second inlet means and an interior volume containing a chamber having a highly elastic wall, means for supplying auxiliary fluid in the form of a biodegradable, non-contaminating, non-aggressive lubricant fluid to said intermediate chamber and said first inlet means whereby said lubricant fluid is fed to the interior of said static separator to contact an exterior surface of said highly elastic chamber wall, fluid conduit means connected at one end to said valve body upstream of said serially disposed seal members and at another end to said second inlet means to supply process fluid to an interior of said highly elastic walled chamber, said highly elastic wall isolating said process fluid from said auxiliary fluid, and position sensor means having a movable head in contact with and cooperating with said highly elastic chamber wall.

2. A seal system according to claim 1 wherein said highly elastic walled chamber is a highly elastic bag.

3. A seal system for a process valve comprising a valve body, a valving element for controlling flow of process fluid through said valve body, said valving element having a stem that is slidingly supported by two spaced apart seal members arranged in series to define therebetween an intermediate chamber, a static separator having first and second inlet means and an interior volume containing a chamber having a highly elastic wall, means for supplying auxiliary fluid in the form of a biodegradable, non-contaminating, non-aggressive lubricant fluid to said intermediate chamber and said second inlet whereby said lubricant fluid is fed to an interior of said highly elastic walled chamber, process fluid conduit means connected at one end to said valve body upstream of said serially disposed seal members and at another end to said first inlet means to supply process fluid to said static separator whereby the process fluid contacts an exterior surface of said highly elastic walled chamber, said highly elastic wall isolating said process fluid from said auxiliary fluid, and position sensor means having a movable head in contact with and cooperating with said highly elastic chamber wall.

4. A seal system according to claim 2 wherein said highly elastic walled chamber is a highly elastic bag.

* * * * *